United States Patent
Jensen et al.

(10) Patent No.: US 12,316,178 B2
(45) Date of Patent: May 27, 2025

(54) TORQUE RIPPLE COMPENSATION WITH ROTOR POCKET NOTCHES IN MULTI-LAYER SYNCHRONOUS MACHINES

(71) Applicant: GM GLOBAL TECHNOLOGY OPERATIONS LLC, Detroit, MI (US)

(72) Inventors: William R. Jensen, Walled Lake, MI (US); Mazharul Chowdhury, Canton, MI (US); Jay Jihyun Kim, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 357 days.

(21) Appl. No.: 17/988,102

(22) Filed: Nov. 16, 2022

(65) Prior Publication Data
US 2024/0162796 A1 May 16, 2024

(51) Int. Cl.
| | |
|---|---|
| *H02K 21/16* | (2006.01) |
| *H02K 1/16* | (2006.01) |
| *H02K 1/276* | (2022.01) |
| *H02K 3/12* | (2006.01) |

(52) U.S. Cl.
CPC ............ *H02K 21/16* (2013.01); *H02K 1/16* (2013.01); *H02K 1/276* (2013.01); *H02K 3/12* (2013.01); *H02K 2201/03* (2013.01)

(58) Field of Classification Search
CPC .......... H02K 1/16; H02K 1/246; H02K 1/276; H02K 1/2766; H02K 21/16; H02K 2201/03; H02K 29/03; H02K 3/12
See application file for complete search history.

(56) References Cited

U.S. PATENT DOCUMENTS

| | | | |
|---|---|---|---|
| 9,935,509 B2* | 4/2018 | Yamaguchi | H02K 1/2766 |
| 2010/0119390 A1* | 5/2010 | Baba | H02K 21/16 |
| | | | 310/156.53 |
| 2014/0217849 A1* | 8/2014 | Soma | H02K 1/2766 |
| | | | 310/156.53 |
| 2016/0301269 A1* | 10/2016 | Yamaguchi | H02K 1/2766 |
| 2016/0301271 A1* | 10/2016 | Saito | H02K 1/246 |

* cited by examiner

*Primary Examiner* — Naishadh N Desai
(74) *Attorney, Agent, or Firm* — Quinn IP Law

(57) ABSTRACT

Aspects of a synchronous electric motor, including a synchronous interior permanent magnet or a synchronous reluctance motor, are disclosed. The outer edges of pockets and magnet pockets, including flux barriers, selectively include one or more notches at the front of the pockets. The use of these notches may redirect flow of the magnetic flux such that overall torque ripple may be reduced without significantly adversely affecting the average torque output of the motor. In some embodiments, various characteristics of the notches may be changed to achieve optimal performance including number, geometry, and location of the notches on select outer edges of the pockets. Another characteristic includes symmetry of the notches or asymmetry, whether in the radial and longitudinal directions of the rotor.

20 Claims, 6 Drawing Sheets

TORQUE RIPPLE COMPENSATION WITH ROTOR POCKET NOTCHES IN MULTI-LAYER SYNCHRONOUS MACHINES

INTRODUCTION

Synchronous electric machines, including for example machines having multi-layer permanent magnet motors and synchronous reluctance motors, have been used with increasing frequency in industrial and commercial applications. For many such applications, including for use in electric vehicles (EVs), industrial equipment, and other commercial products where factors such as constant speed at different loads, high starting torque, and economy at low speeds are important, a greater overall performance efficiency may be achieved. This is true in part because the speed of the rotor may equal that of the stator in synchronous machines, thereby avoiding the phenomenon of slip that characterizes other commonly used motors.

Synchronous motors have shortcomings. For one, higher order slot harmonics and other phenomena involving the interaction between the stator's rotating magnetic field (RMF) and the rotor's magnetic characteristics may generate a pulsating ripple in the output torque. The torque ripple impacts the performance of the machine, for example, by creating additional noise, vibrations, and harshness (NVH). While attempts to mitigate the torque ripple have been proposed in the literature, the attempted solutions are either insufficient or create other problems, like a noticeable reduction in power, or both.

SUMMARY

An aspect of the present disclosure includes a synchronous electric motor. The motor includes a stator, which in turn includes a plurality of protrusions arranged around an inner periphery thereof to define slots between adjacent ones of the protrusions. A plurality of conductive windings axially traverse at least some of the slots. The windings are configured to carry alternating currents for generating a rotating magnetic field (RMF).

The motor further includes a rotor within the stator. The rotor is configured to rotate based on a torque induced by an interaction between the RMF and magnetic characteristics of the rotor. The rotor has one or more pockets formed therein. The one or more pockets have outer edges relative to a radial component of the rotor. The one or more pockets include at least one notch formed in selected ones of the outer edges, which is configured to reduce torque ripple during motor operation. The at least one notch may in some embodiments be semi-elliptical in shape.

The motor may include a synchronous reluctance motor, wherein the one or more pockets are flux barriers. In other embodiments, the motor may include a permanent magnet synchronous motor. The one or more pockets may further include one or more magnet pockets, respectively. Each of the one or more magnet pockets may be configured to hold one or more permanent magnets.

In various embodiments, selected ones of the outer edges include a single notch, or a plurality of notches. The one or more magnet pockets may include a large magnet pocket for holding a larger magnet and a small magnet pocket for holding a smaller magnet. In further embodiments, the one or more magnet pockets include, in the selected ones of the outer edges, first and second magnet pockets. The first magnet pocket having a different number, size, shape or position of notches than the second magnet pocket. The at least one notch may in some embodiments be disposed on one or both of an outer surface of the large magnet pocket or an outer surface of the small magnet pocket.

In further embodiments, the at least one notch includes a plurality of notches arranged at the selected outer edges of the one or more pockets. The plurality of notches may be positioned at different angular locations relative to an angular component of the rotor. In another arrangement, the rotor includes at least one set of two pockets in complementary positions relative to one another. A first of the two pockets includes one or more notches symmetrically disposed in size and location relative to a corresponding one or more notches included on a second of the two pockets.

The slot order harmonics may include ripple torque at frequencies determined by a spacing between adjacent slots. In some cases, a size of the notch, including a width or a depth of the notch, may be optimized to reduce the torque ripple without a corresponding decrease in motor performance exceeding a threshold.

In still further embodiments, the rotor includes a plurality of individually identical axially laminated layers that each include the one or more pockets and that together form a stack. The stack includes upper and lower sections of consecutive ones of the layers. The layers of the lower section are inverted relative to the layers of the upper section. The upper and lower sections each have the same number of layers. The at least one notch included in the upper section is asymmetrically opposed in angular position relative to the corresponding at least one notch in the lower section.

Another aspect of the disclosure includes a synchronous electric motor. The motor includes a stator, which in turn includes a plurality of protrusions disposed around an inner periphery to create a plurality of corresponding slots inset around the periphery. A plurality of conductive windings axially traverse some or all of the slots. The windings are configured to carry alternating currents for collectively producing a rotating magnetic field (RMF).

The motor further includes a rotor positioned within the stator. The rotor is configured to rotate based on a torque caused by an interaction between the rotor and the RMF. The rotor includes one or more magnet pockets. Each magnet pocket has one or more magnets inset therein. Selected outer edges of the one or more magnet pockets include at least one semi-elliptically shaped notch for reducing torque ripple generated by slot order harmonics.

In some arrangements, the one or more magnet pockets include, in the selected outer edges, a single notch or a plurality of notches. The single notch or the plurality of notches may selectively vary relative to each other with respect to size, number, or position. In some embodiments, the one or more magnet pockets include a large magnet pocket for holding a larger magnet and a small magnet pocket for holding a smaller magnet.

In other embodiments, a first section within the rotor includes a magnet pocket having a different number, size, shape, or position of notches than another magnet pocket included in a second section within the rotor. The at least one semi-elliptically shaped notch may in further embodiments be disposed on one or both of an outer surface of the large magnet pocket or an outer surface of the small magnet pocket.

In yet other embodiments, the rotor includes a plurality of individually identical axially laminated layers. Each of the layers includes the one or more magnet pockets including the at least one semi-elliptically shaped notch. The rotor includes first and second sections of consecutive ones of the layers. A number of the layers in each section of the first and second sections is identical. The layers in the first section are inverted relative to the layers in the second section. This collective configuration is such that the at least one semi-elliptically shaped notch in the first section is asymmetrically opposed in angular position relative to the at least one semi-elliptically shaped notch in the second section.

Still another aspect of the present disclosure includes a synchronous reluctance electric motor. The motor includes a stator. The stator includes a plurality of protrusions disposed around an inner periphery to create a plurality of corresponding slots arranged around the periphery. A plurality of coils are wound around some or all of the protrusions. The windings are configured to carry alternating currents for collectively producing a rotating magnetic field (RMF).

The motor further includes a rotor positioned within the stator. The rotor is configured to rotate based on a torque created by a tendency of the rotor to attempt to align with the RMF. The rotor includes a plurality of axially laminated layers that together form a stack. At least one of the plurality of layers includes one or more pockets. Selected outer edges of the one or more pockets include at least one semi-elliptically shaped notch for reducing torque ripple.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, explain the principles of the disclosure.

DETAILED DESCRIPTION

Figure 1:
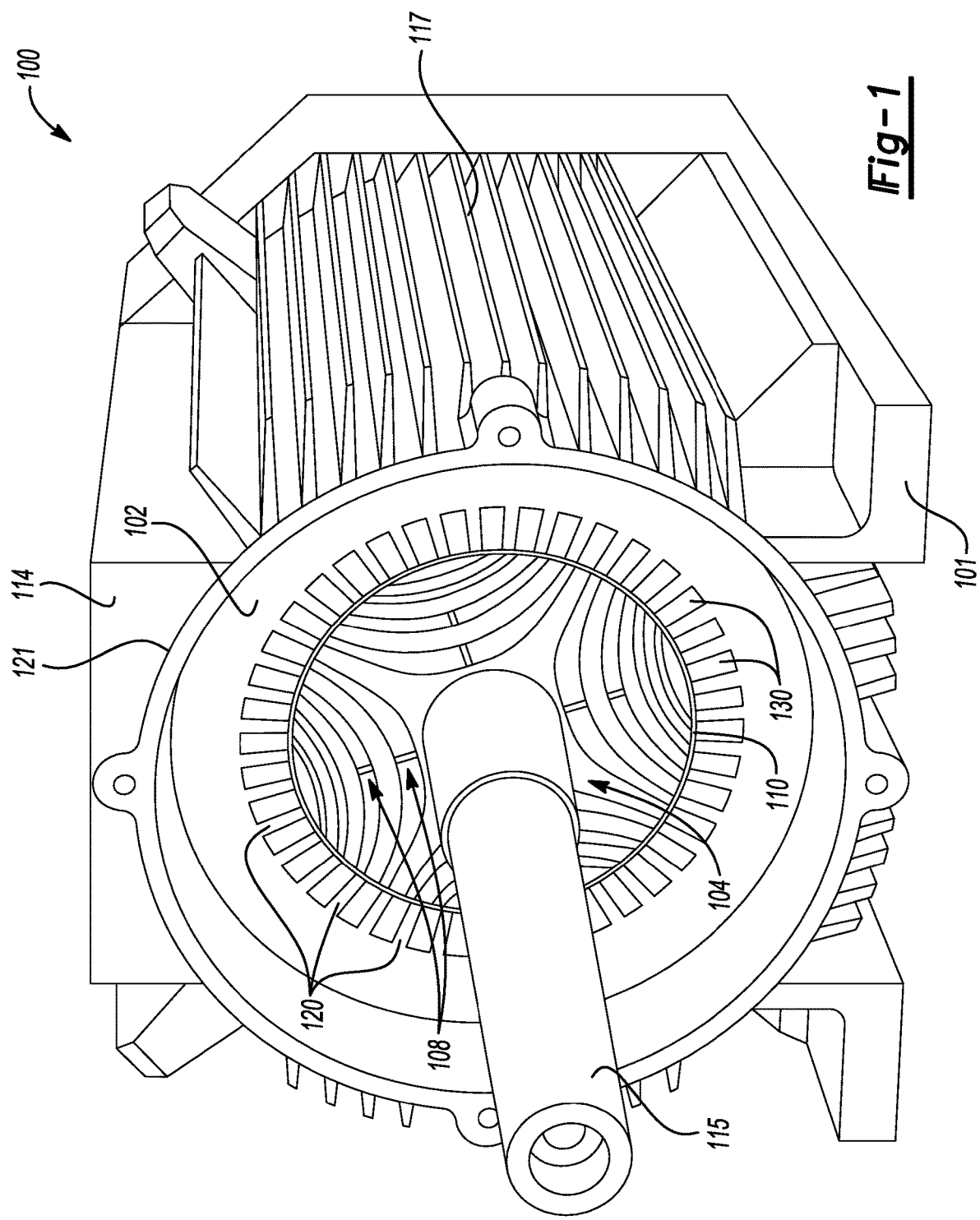
FIG. 1 is a perspective view of an exemplary synchronous reluctance motor that may be used in the context of the present disclosure.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

The principles of the present disclosure are directed to synchronous machines, which may include machines powered by a synchronous electric motor. Exemplary types of synchronous motors to which these principles apply include, for example, the permanent magnet synchronous motor and the synchronous reluctance motor. The motors may range from permanent magnet motors having a single magnet pocket (as discussed further below) to synchronous reluctance motors. In some cases, the rotors of the synchronous motors are formed by sandwiching together a number of layers such that the layers are axially laminated into a stack, or rotor body. In some cases, sections of a rotor or sections of a stack are referenced herein. For purposes of this disclosure, as will be discussed in more detail below, the sections of a rotor or stack refer to longitudinal cross-sections of the rotor. For example, in a simple case where a rotor is cylindrical in shape, the section of the rotor may constitute a longitudinal portion of the cylinder, such as a designated region of the rotor that itself is also conceptually cylindrical in shape.

As another example, the rotors of some synchronous motors are formed by axially laminating together a plurality of layers such as a section of the rotor or stack, for purposes of this disclosure, refers to a cross-section of two or more consecutive axially laminated layers. Briefly referring back to the example of the cylindrical rotor for simplicity, the rotor may be identified as including two or more sections in some cases, such as a cylindrically shaped top half and a cylindrically shaped bottom half. In this case, the top half may include a plurality of consecutive axially laminated layers in the shape of a half-cylinder, wherein the bottom half may include another plurality of consecutive axially laminated layers also in the shape of a half cylinder. The section of the rotor, unless otherwise specified, need not constitute an entire longitudinal half of the rotor, but instead may include a section of two or more consecutive layers. It should be understood that the rotor need not be cylindrical in shape and may in practice include a wide variety of geometries. The section parlance expressed above is therefore equally applicable to rotors of a wide variety of shapes, with the section of the rotor referring to cross-sectional regions of the rotor that extend into the stator, rather than regions extending radially.

Further, unless otherwise specified, it should also be understood that the rotor used in synchronous electric motors need not be formed by laminating individual layers together from a manufacturing standpoint is, although this may often be the case.

Synchronous motors include types of electric motors that use alternating current (AC) as an input source to its multiple stator windings. One example of synchronous motors are synchronous interior permanent magnet (IPM) motors (or more simply synchronous permanent magnet motors), which employ permanent magnets in the rotor portion of the motor using a wide variety of different potential configurations. Another example of a synchronous motor is a synchronous reluctance motor. The principles of operation of both of these motors involve a multi-protrusion, multi-slot stator as described further below with reference to FIG. 1. Windings of insulated, conductive wire may be wrapped around the protrusions situated on an inner periphery of the stator. In some cases, the windings or coils are wrapped around select protrusions, and in other cases the coils are wound around each of the protrusions. For purposes of this disclosure, a protrusion of a stator may itself employ more than one protruding feature or a unique geometry, in which case the coils are said to be wrapped around the protrusions if the coils are wrapped around a leg, portion, outcropping, or other geometrical feature of the protrusion. The windings may traverse the slots, or spaces between adjacent protrusions. In some configurations, multiple windings selectively carry different phase of an alternating current and use a total of three or more phases used to generate a rotating magnetic field (RMF).

Although they operate differently in principle, the synchronous permanent magnet motor and the synchronous reluctance motor both may perform useful work through the rotation of the rotor. The rotation may be caused by a torque generated by an interaction between the RMF of the stator and one or more magnetic characteristics or features of the rotor. In synchronous permanent magnet motors, the magnetic characteristics or features include the magnetic field(s) generated by permanent magnets in the rotor, the geometry of the magnet(s), the strength of the field(s), and the like.

The magnet characteristics of features of the rotor in the case of a synchronous reluctance motor include, for example, the geometrical features of the rotor. These may include the regions of maximum and minimum reluctance, which is governed by the geometry of the rotor, the type of material used to make the rotor, and other factors that are relevant in the permanent magnet motor case as well. In both types of motors, a torque is generated by this interaction between the RMF and the magnetic features of the rotor. The synchronous reluctance motor takes advantage of the fact a magnetic field travels the path of least resistance, the latter term being called reluctance. Maximum magnetic flux from a magnetic field (such as the RMF) tends to pass through the iron, steel or other conductor instead of the air, because the reluctance values of the conductors are much lower than that of air.

When the RMF passes through the conducting material on the rotor body in the synchronous reluctance motor, it tends to align the magnetic domains to produce another temporary magnetic field in the rotor. Thus, an attractive force may be established between the opposing poles on the respective magnetic field. A synchronous permanent magnet electric motor functions using similar principles; however, in the case of the latter, the magnetic field may be established in the rotor by the magnets themselves.

Referring back to the synchronous reluctance motors, the rotor is free to rotate. Thus, the attractive forces established between the various poles are such that the rotor's salient poles tend to align with the RMF to minimize the path of least reluctance. This tendency produces a torque in the rotor, which begins to rotate. If an alignment were to occur, the torque becomes zero since the forces are aligned in least reluctance. Ordinarily, the reluctance motor may be designed such that the rotor rotates at the same speed as the RMF. However, particularly for higher speed/power motor configurations, the inertia of the rotor is insufficient to allow it to follow the RMF to reduce the reluctance.

Thus, in many designs the synchronous reluctance motors are not self-starting. This obstacle may be overcome by using a controller to vary the frequency of the current through the windings such that the RMF starts slowly, in a manner commensurate with the inertia of the rotor. This type of electric reluctance motor, like the permanent magnet motor, is deemed "synchronous." The controller may vary the frequency of the input AC current and maintain the position of the rotor to ensure that the attractive force persists. In some other practical implementations, an induction motor is used to "self-start" the rotor until enough speed has been attained.

As a result, the rotor may accelerate to high speeds and reach a constant speed that matches the angular speed of the RMF. Advantageously, this rotational alignment between rotor and stator fields may be maintained at different loads on the motor, provided that the controller ensures that the load angle does not exceed a threshold.

It is the difference in a maximum flux configuration of the rotor relative to the stator and a minimum flux configuration that creates a maximum torque output. Accordingly, the geometrical design of the rotor in a multi-pole synchronous electric motor considers an angular rotor position that results in a high reluctance of the field lines versus and an angular rotor position that results in a low reluctance of the field lines.

Referring to the drawings, wherein like reference numbers refer to like features throughout the several views, FIG. 1 is a perspective view of an exemplary synchronous reluctance motor 100 that may be used in the context of the present disclosure. The motor includes a base 101 which may be coupled to a housing 114 of the motor. The housing 114 may include the controller for controlling the input AC current and monitoring parameters, etc. The motor 100 includes a stator 102. The housing 114 may be coupled to sets of fins 117 for dissipating heat generated by the motor 100.

A number of protrusions 120 are arranged around an inner periphery of the stator 102. The size, shape, number and overall geometry of these protrusions may vary depending on the design. The protrusions collectively define slots 130 between adjacent protrusions. The slots 130 are indentations in the stator inset into the inner periphery. The spacing and number of slots are relevant to defining various characteristics of the motor 100, such as number of poles, number of phases, and number of harmonics. In both synchronous reluctance motors as in FIG. 1 and permanent magnet motors, the various opening and orifices (pockets) in the rotor 104, as well as the magnets in the case of a permanent magnet motor, also create harmonics.

Referring still to FIG. 1, the slots 130 arranged around the inner portion of the stator 102 open to an air gap 110 which separates the stator 102 and rotor 104. For simplicity, although the slots 130 in the stator 102 and various openings in the rotor 104 lead directly to the air gap 110, FIG. 1 defines the air gap 110 using two circles that extend around the inner periphery of the stator 102 and outer portion of the rotor 104. The rotor 104 in this configuration has a cylindrical outline, although this geometry may vary widely and other rotors may employ different geometries, e.g., using a different number and geometry of salient poles distributed around the rotor, or otherwise. A circular housing 121 is disposed across an outer periphery of the stator 102.

While not shown to avoid unduly obscuring concepts of the disclosure, a plurality of conductive windings are wound around the protrusions. The windings axially traverse at least some of the slots. The different windings may carry different phases of alternating current relative to each other to strategically generate an RMF. In this configuration, by virtue of the traversal of the winding along the slots and thus along a longitudinal direction of the rotor, the alternating current may generate an RMF that extends (or out of) a radial component of the rotor 104. Depending on the geometry of the protrusions 120 and slots 130 on the stator as well as the physical configuration of the rotor 104, the position and total number of windings may vary without departing from the spirit and scope of the present disclosure.

The rotor 104 may in some embodiments be composed of a plurality of axially laminated layers. In some sections of the rotor 104, the axially laminated layers may be identical to create identical characteristics. For example, the axial direction of the rotor 104 in FIG. 1 is in the longitudinal direction along the rotor 104, so that the different layers are not directly visible. The layers, however, may be constructed to create flux barriers 108, which are pockets of air gaps designed within the rotor 104. A primary purpose of the flux barriers 108 is to create the difference between high and low reluctance positions to enable the rotor 104 to rotate using the principles above. In the embodiment of FIG. 1, there are four sections of four flux barriers 108 each.

The flux barriers 108 correspond to a low reluctance. Their presence enables the rotor 104 to have a relative angular position (relative to the stator 102) of low reluctance and a relative angular position of high reluctance. The difference between the two positions in the case of the synchronous reluctance motor creates the torque needed to rotate the rotor 104, as noted above. The rotor 104 may also rotate in either direction depending on the overall polarities of the alternating current through the windings. The flux barriers 108 may constitute pockets in the rotor 104 having outer edges that, for a given flux barrier 108, is radially farther from a center of the rotor than the respective inner edges.

The motor of FIG. 1 also shows a shaft 115. Depending on the application, the shaft may rotate with the rotor at different loads to do work. In an EV, for example, the turning shaft may be used to rotate one or more of the wheels.

Figure 2:
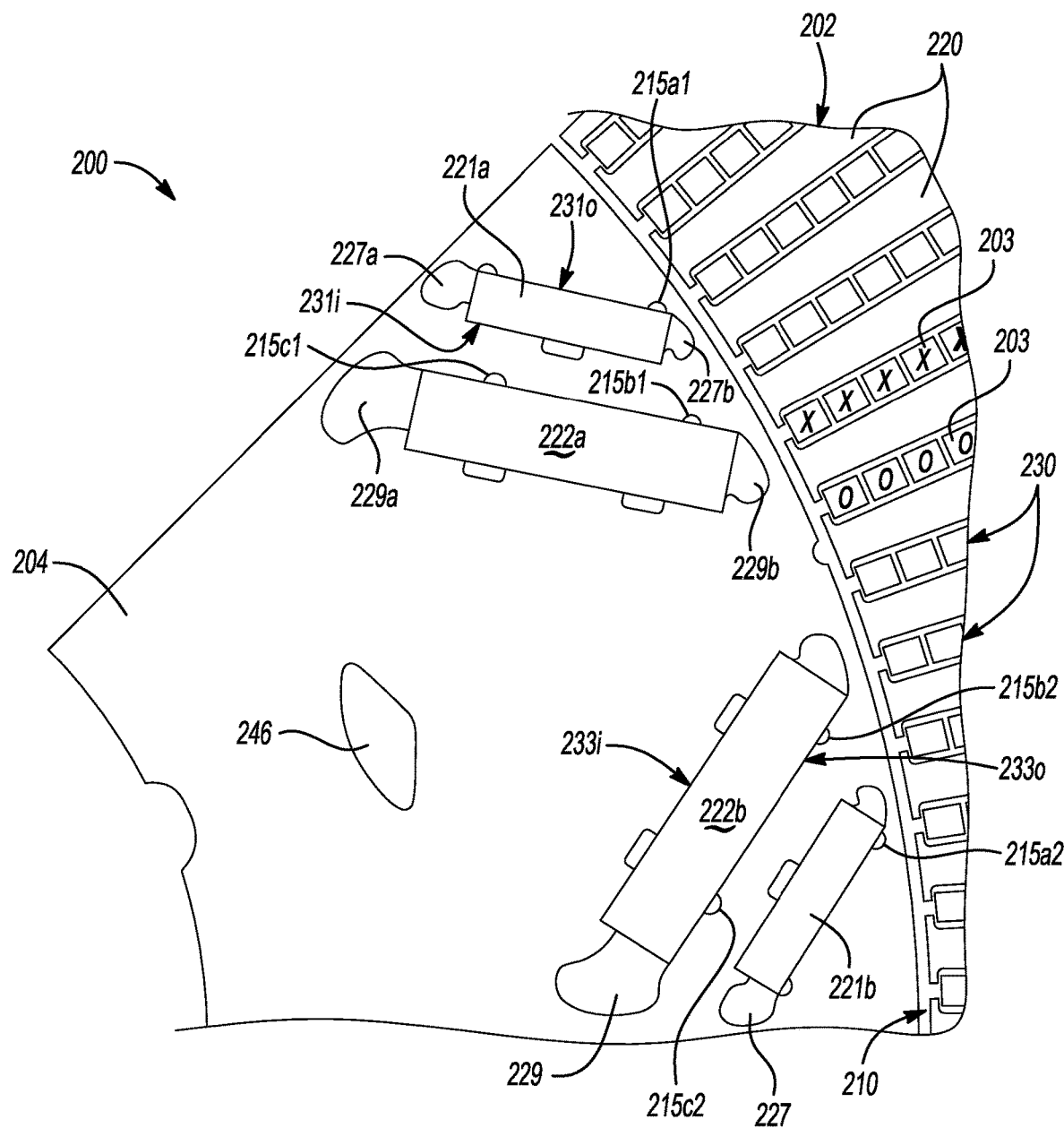
FIG. 2 is an exemplary cross-sectional view of a synchronous permanent magnet motor including portions of the stator and rotor, in accordance with an embodiment.

FIG. 2 is an exemplary cross-sectional view of a synchronous permanent magnet motor 200 including portions of the stator 202 and rotor 204, in accordance with an embodiment. The stator 202 is shown in cross-section from a top-down view perspective. The stator includes protrusions 220 and slots 230, which are the gaps inset between adjacent protrusions 220. While an angular section of the motor 200 is shown, the protrusions 220 and slots 230 wrap 360 degrees around the rotor 204. In this example motor, the gaps are populated by the windings 203, the latter of which are represented by the rectangular elements between two slots 230.

The rectangular elements each represent insulated conductors (windings 203 of coil) wrapped around the protrusions for generating the RMF. The winding 203 are traversing (extending in the direction of) the slots, with alternating current at a given instant coming out of the page as demonstrated by the x symbol and the same alternating current going into the page as demonstrated by the o symbol. The horizontal component of the windings are omitted for simplicity, but the windings 203 in this arrangement also wrap around each of the protrusions 220. In other embodiments, the windings 203 may wrap around multiple protrusions 220, or in directionally favorable sub-protrusions or other structures, each of which are deemed to be part of the protrusions 220 and thus fall within the scope of the present disclosure. In still other embodiments, the windings 203 are wrapped around select protrusions, with other protrusions having no windings.

For example, in the stator 202 shown, a winding 203 of conductors may be traversing the slot 230 at a given instant wherein the AC current is parallel to a first longitudinal direction of the rotor. The winding 203 may continue to be wrapped around a top of the protrusion 220 between the two slots (not shown), this time in an angular direction of the rotor 204. The winding 203 then traverses the o direction of the slot 230 such that the alternating current is flowing at the given instant in an opposite direction longitudinal to the rotor 204. The winding then may flow, at the given instant, around the posterior of the protrusion in an angular direction of the rotor 204 opposite the angular direction of the AC current flowing through the same winding across the top of the protrusion. In some cases, the protrusions 220 may have orifices through which the windings 203 are wound. This embodiment is still considered to qualify as windings traversing slots and wrapped around one or more protrusions, as may be in the case in the geometry.

The AC current in different windings 203 may deliberately flow in different phases relative to one another. For example, starting from the left most visible winding, the first four windings 203 may carry AC current of the same phase when traversing the slots 230 and extending around their respective protrusions 220. The second set of four windings 203 may carry AC currents of a second one of the same phases relative to the first phase. The third set of four windings may carry AC currents of a third one of the same phases relative to the first and second phase. The cycle may repeat, or the remaining non-visible portion of the stator's inner periphery may have additional sets of four windings 203 that carry still additional phases relative to the first three, and so on. The present disclosure covers each of these configurations.

Continuing with FIG. 2, the rotor 204 is also shown in cross-sectional view. In this arrangement, the rotor has a cylindrical shape at its outer edge. The rotor is separated from the stator by air gap 210, which extends around the outer periphery of the rotor. As noted above, the rotor 204 is free to rotate when the motor is off. Different geometrical techniques have been proposed that are employed to mitigate ripple. An example may include pocket 246. The pocket 246 may be an air gap extending partly or all the way through the longitudinal direction of the rotor 204. Other examples of pockets may include drilled or bored-out circular holes in the layers of the rotor 204 before laminating them together.

The section of the rotor visible in FIG. 2 includes magnet pockets. A first of the magnet pockets is defined in part by air gaps 227a and 227b, which are part of the same, single magnet pocket for holding permanent magnet 221a. A second of the magnet pockets is defined by air gaps 229a and 229b, which are part of the same magnet pocket for holding magnet 222a. A third of the magnet pockets, shown simply with air gaps 227, holds magnet 221b. The third magnet pocket is geometrically identical to the first magnet pocket that holds magnet 221a but is oriented at a different angle than the first magnet pocket. A fourth magnet pocket, shown with air gaps 229, holds magnet 222b. In this embodiment, magnet 221a has the same features as magnet 221b. Also, in this embodiment, magnet 222a has the same features as magnet 222b. Magnet 222a and magnet 222b are larger than magnet 221a and 221b. Because an angular portion of the rotor 204 is shown, additional such configurations of magnets may be included along the remaining angular portions.

Each of the four magnet pockets has at least an outer edge and an inner edge. The outer edge may include an edge of the magnet pocket that, relative to a radial component of the rotor, is farther from a center of the rotor than an inner edge, the latter of which is radially closer to a radial center of the rotor. For example, the first magnet pocket, shown to include air gaps 227a and 227b, includes an outer edge 231o that, relative to a radial component of the rotor, is closer to a center of the rotor than a corresponding inner edge 231i of the same magnet pocket. Each of the remaining magnet pockets in this embodiment includes a respective outer edge and an inner edge. Referring to the fourth magnet pockets defined to include air gaps 229 and for holding magnet 222b, the fourth magnet pocket has an outer edge 233o and an inner edge 233i.

In an aspect of the disclosure, to reduce torque ripple, the first magnet pocket holding magnet 221a includes two semi-elliptical notches on its outer edge 231o, including notch 215a1. The second magnet pocket holding magnet 222a also includes two semi-elliptical notches 215b1 and 215c1 on its outer edge. The third magnet pocket that holds magnet 221b includes two notches on its outer edge, including notch 215a2. Notably, in this embodiment, the notches on the first magnet pocket have the same shape and geometrical configuration as the notches on the third magnet pocket. In other embodiments, this need not be the case. Referring still to rotor 204 of FIG. 2, the second magnet pocket holding magnet 222a includes on its outer edge semi-elliptical notches 215b1 and 215c1. The fourth magnet pocket holding magnet 222b includes on its outer edge 233o semi-elliptical notches 215b2 and 215c2. As with the first and third magnet pockets, the notches on the second and fourth magnet pockets are the same in geometrical orientation and relative position, with the difference being the differing angles of the second and fourth magnet pockets. It should again be underscored that the rotor 204 may include additional magnet pockets around its angular periphery, including in some arrangements, magnet pockets identical in orientation to the first, second, third and fourth magnet pockets.

The notches implemented in the outer edges of the four magnet pockets include design features incorporated in the lamination geometry of the rotor 204 that may mitigate torque harmonics. Some existing rotor lamination design features reduce torque ripple while having some effect on average torque production. The above-described design features, by contrast, result in a reduction in torque ripple harmonics (see below), and mainly in slot order harmonics, which may be difficult to mitigate using mere controller techniques. Advantageously, and unlike existing approaches, the notches described above also show an insignificant adverse effect on average torque production.

The notches in the above-described embodiments are located on the perimeter or outer edges of the respective magnet pockets and are spread out to include notches closer to the inner radial portion of the rotor 204 and the outer radial portion of the rotor 204. Existing rotor lamination design features are added closer to the outer diameter of the rotor (see, e.g., notch 378 of FIG. 3). This existing implementation may exacerbate rotational spin loss, depending on the overall design. The above-described embodiments of FIG. 2 reduce the torque ripple by suppressing the slot order harmonics, which may include higher order harmonics. These embodiments therefore provide additional (or alternative) design parameters that may be optimized with other existing design parameters to form an optimal design. This combinational approach of the above-described embodiments with existing features beneficially provides greater flexibility for manufacturers to optimize machine designs for meeting high performance NVH specifications.

The configuration of the notches in FIG. 2 is one of numerous potentially suitable embodiments. For example, in some cases, select outer edges of the pockets may include notches, meaning that other pockets may not include notches on the respective outer edge. In the case of the permanent magnet motor 200 as in FIG. 2, and in general cases, various features of the notches may be optimized to determine which configuration is suitable for the motor design at issue. For motors that include the pockets in FIG. 2 and motor configurations disclosed herein, example features that may be optimized include the size of the notches. This includes, for a given section of one or more layers along a longitudinal cross-section of the rotor, the width and depth of the notches. One exemplary, but non-exhaustive, optimal geometry includes the semi-elliptical nature of many of the notches. In FIG. 2, the notches 215a1 and 215a2, the notches 215b1 and 215b2, the notches 215c1 and 215c2, and the remaining pair of corresponding notches (unnumbered) on the outer edge of the pockets holding magnets 221a and 221b, are semi-elliptically shaped. Additional or different shapes may be used as well. The notch on an outer edge, or the plurality of notches on the outer edge as the case may be, may selectively vary relative to each other with respect to size, number, position—for example, the designer may choose to selectively vary otherwise notches in different pockets by selecting a design using different geometrical features in size, number, position or other means of differentiating notch attributes relative to one another.

Additional features that may be optimized include the location of the notches. Referring to the example of FIG. 2, exemplary locations may include whether two or more notches are located on the same magnet pocket with respect to each other. For the each of the two magnet pockets holding larger magnets 222a and 222b, two notches (notches 215b1 and 215c1 for the case of magnet 222a, and notches 215b2 and 215c2 for the case of magnet 222b) are included on the outer edges of the same magnet pocket. The same is true for the pair of notches on each of the magnet pockets holding smaller magnets 221a and 221b. In this embodiment of FIG. 2, there is a symmetrical relationship between the two pairs of notches for the larger magnets 222a and 222b and the two pairs of notches for the smaller magnet 221a and 221b in that the relative size and position of the notches on the outer edges are the same for each sized magnet. This configuration may vary, however, as in other embodiments, corresponding magnet pockets may include a different number of notches, or no notches. Thus, another criterion that may be selected is the relative location of the notches, if any, on the edges of pockets holding the large magnet (e.g., magnets 222a and 222b), and pockets holding the small magnet (e.g., magnets 221a and 221b).

As noted above, the relative location of notches in the example embodiment of FIG. 2 is the same between the outer edges of magnet pockets (of those shown) that correspond to a given-sized magnet. In other embodiments (see, e.g., FIG. 3), the relative location of the notches may differ. That is, one magnet pocket may include one or more notches, while a corresponding magnet pocket holding an identically sized magnet may include a different number or position of notches, or no notches. Yet another criterion that may be optimized is the angular location of the notches. The notches may be varied among different angular locations on the rotor that achieves maximum benefit. For example, the notches 215b1 and 215c1 corresponding to the outer edge of the pocket holding magnet 222a have two distinct angular locations relative to an angular component of the rotor.

Following from some of the criteria identified above, another feature that may be optimized throughout the entire rotor is the number of notches included in each outer edge. This may include a consideration of both the number of notches on the same pocket (0, 1, 2, etc.) and a consideration of the number of notches on different layers. For example, a magnet pocket may be characterized in some embodiments by a pocket including a given number of axially laminated layers. The pocket holding the magnet at issue may include notches on outer edges, or it may include notches on select outer edges of the pocket holding the same magnet. In addition, other criteria may include varying the above notch characteristics as a function of different sections of the rotor. For example, a first magnet pocket holding a magnet in a first section may have two notches on its outer edge. Other sections of the rotor may include a different configuration of notches, pockets, and magnets. This means that the above characteristics may be optimized both in a two-dimensional x-y plane that may include a particular cross-section of the magnet, and in a third dimension longitudinal to the rotor.

Still another characteristic that may be varied to achieve minimum torque ripple without sacrificing average torque output is the symmetry or asymmetry of the notches. With respect to the same magnetic pole, for example, the size and/or location of the notches may be made symmetrical or asymmetrical with respect to one another (see, e.g., FIG. 4 versus FIG. 3). An example of a symmetrical notch configuration is shown with reference to FIG. 4. In other embodiments, different layers across a longitudinal direction of the stack may be flipped relative to one another to achieve an intentional asymmetry in the longitudinal direction of the rotor. This feature is described more fully in FIG. 7.

It will be appreciated that in synchronous reluctance motors, the pockets to which notches may be selectively added may include the flux barriers 108 of FIG. 1. In other embodiments, a synchronous reluctance motor may include one or more pockets in different sections of the rotor in addition to the existing flux barriers. The one or more pockets may further include notches along their respective outer edges. In either case, the notches may be optimized in a similar manner in the synchronous reluctance motor using some of the above criteria, but without the use of permanent magnets.

Figure 3:
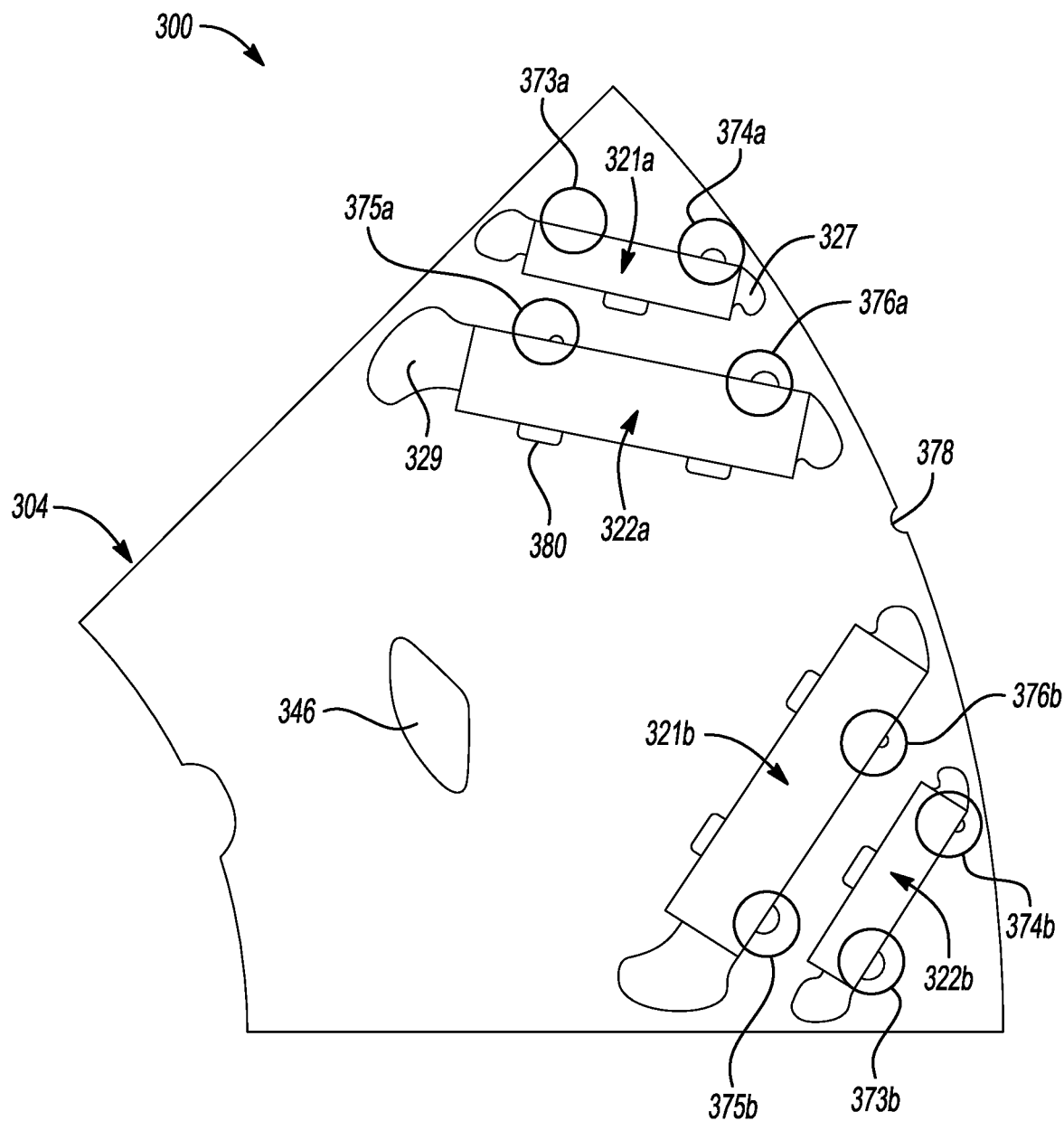
FIG. 3 is an exemplary cross-sectional view of a portion of a rotor used in a synchronous permanent magnet motor, in accordance with an embodiment.

FIG. 3 is an exemplary cross-sectional view 300 of a portion a rotor 304 used in a synchronous permanent magnet motor, in accordance with an embodiment. Like in FIG. 2, a single angular section of the rotor 304 is shown for simplicity and clarity. In an actual 360-degree angular depiction of the rotor, the configuration of FIG. 3 may be repeated in a symmetrical manner across the rotor 304, or different notch characteristics may be used altogether based on the criteria described above. In other embodiments, the magnet pockets corresponding to different magnets across the angular perimeter of the rotor 304 may be such that only selected outer edges include notches, whereas some of the magnetic pockets deliberately exclude the notches.

Like in FIG. 2, the rotor 304 includes on its outer symmetrical edge an indentation 378 inset from an outer portion of the rotor 304. This indentation is based on an existing configuration of a rotor for mitigating ripple, as discussed above. The rotor 304 also includes a pocket 346 radially closer to a central point of the cylinder. In FIG. 3, however, the features of particular interest are shown in the circular regions 373a, 374a, 375a, 376a, 373b, 374b, 375b, and 376b. The rotor 304 also includes magnet pockets that include, like in the embodiment of FIG. 2, a gap region 327 which is continuous with the remainder of the magnet pocket that also has a region including a smaller magnet 321a. Adjacent the magnet pocket holding smaller magnet 321a is a larger magnet pocket holding a larger magnet 322a. Like the smaller magnet pocket, the larger magnet pocket also includes two air gap regions 327 which together with the region holding the magnet 322a are part of one continuous magnet pocket. The regions 327 and 329 for the respective magnet pockets need not be identical. That is, gap regions 327 and 329 may be shaped differently than their corresponding gap regions located closer to the outer edge of the rotor 304 and part of the same magnet pocket.

While the general magnet pocket and magnet configuration of FIG. 3 is like that of FIG. 2, it will be appreciated by those skilled in the art upon review of this disclosure that numerous other types of permanent magnet synchronous motors may be contemplated using a greater or lesser number of magnets and including different properties. The features of FIG. 3 are designed to be consistent to avoid unduly obscuring the disclosure with concepts not directly related to torque mitigation. Thus, as before, each of the four magnet pockets corresponding respectively here to magnets 321a, 322a, 321b, and 322b are similarly positioned and include an outer edge on which the above-identified circular regions are focused. That said, the notch configuration in FIG. 3 is a symmetric notch design that is markedly different from that of FIG. 2.

Referring still to FIG. 3, the magnet pocket holding magnet 321a includes a single notch within circular region 374a and positioned on the outer edge (relative to a radial directional component of the rotor 304) of the magnet pocket holding smaller magnet 321a. Unlike in FIG. 2, the circular region 373a includes no notch, meaning that the outer surface of the magnet pocket holding magnet 321a has one total notch. The notch is semi-circular in shape in this embodiment. Referring next to the magnet pocket holding the same size and type of smaller magnet 322b, the corresponding notch on the circular region 374b is smaller in size than the notch shown in circular region 374a. In addition, while the circular region 373a includes no notch, the circular region 373b on the outer edge of the magnet pocket holding magnet 322b includes a notch. Thus, the magnet pockets holding smaller magnets 321a and 322b show examples of different sizes and configurations of notches, as well as a different number of notches on one outer edge versus another and therefore overall angular asymmetries in rotor 304.

Referring next to the magnet pocket having air gaps 329 and holding larger magnet 322a, a first circular region 375a on an outer edge of the magnet pocket includes a first, small notch and a second circular region 376a on the same outer edge includes a second, larger notch. Referring now to the corresponding magnet pocket holding the same size and type of larger magnet 321b as magnet 322a, a third circular region 376b includes a small notch having a different size and position than the counterpart notch identified in circular region 376a. For example, the notch in circular region 376b is smaller and located father away from the outer radial edge of the rotor 304 than the notch in comparable circular region 376a. The latter circular region has a notch that is both larger and closer to a radial edge of the rotor, giving rise to differences in size and position of the notches in other comparable magnet pockets. A fourth circular region 375b on the same outer edge has a large notch positioned closer to a radial center of the rotor than its counterpart notch in circular region 375a, the latter of which is both smaller and closer to the outer perimeter of the rotor 304.

It should be noted that, like in FIG. 2, the rotor of FIG. 3 includes rectangular air gaps 380 located adjacent the inner edge of the respective air gaps. These regions on the inner edge are not part of the design geometry having the characteristics of the present disclosure.

In short, FIG. 3 includes a number of the above-identified characteristics reflecting the differences in a number of properties of the notches that may be modified to provide, given the overall geometry of the motor, the highest amounts in ripple improvement without a corresponding sacrifice in significant average torque or peak torque values. In some configurations, the manufacturers may simulate different configurations and may pass those simulated configurations in which the average torque does not exceed some threshold value in performance degradation.

The action of the notches includes redirecting some of the magnetic flux from the magnets in the synchronous permanent magnet design in a manner that tends to cancel higher order harmonics for reducing NVH. Manufacturers in many industries are seeking a torque that has a direct current (DC) response. Thus, harmonic components are undesirable. The harmonic order is related to the rotating speed of the rotor and is based in part on the slot spacing of the stator. For example, if the first harmonic completes six times in a single rotation, the first harmonic is deemed six times faster than the fundamental speed.

The notches illustrated herein are most beneficial with respect to eliminating higher order slot harmonic ripple, of which there are both electrical and mechanical counterparts. Lower ripple may be more effectively mitigated in many cases by the controller, which may vary the input criteria of the AC current as discussed above.

Beneficially, the notches may be implemented without having an appreciable, if any, effect on the magnet design of the motor. Existing design solutions discussed in part above may help reduce the ripple in certain implementations, but they also reduce the average output torque by potentially large margins. In fact, the notches described herein with respect to various embodiments may often be made small so as to have little or no effect on the average torque output from the motor. While the notches described herein are often shown as having a semi-elliptical shape, one or more different shapes may be used.

Because a greater number or sized notch tends to reduce ripple, it may be valuable to a designer to perform a number of simulations to select those geometries where the average torque is not significantly impacted.

Figure 4:
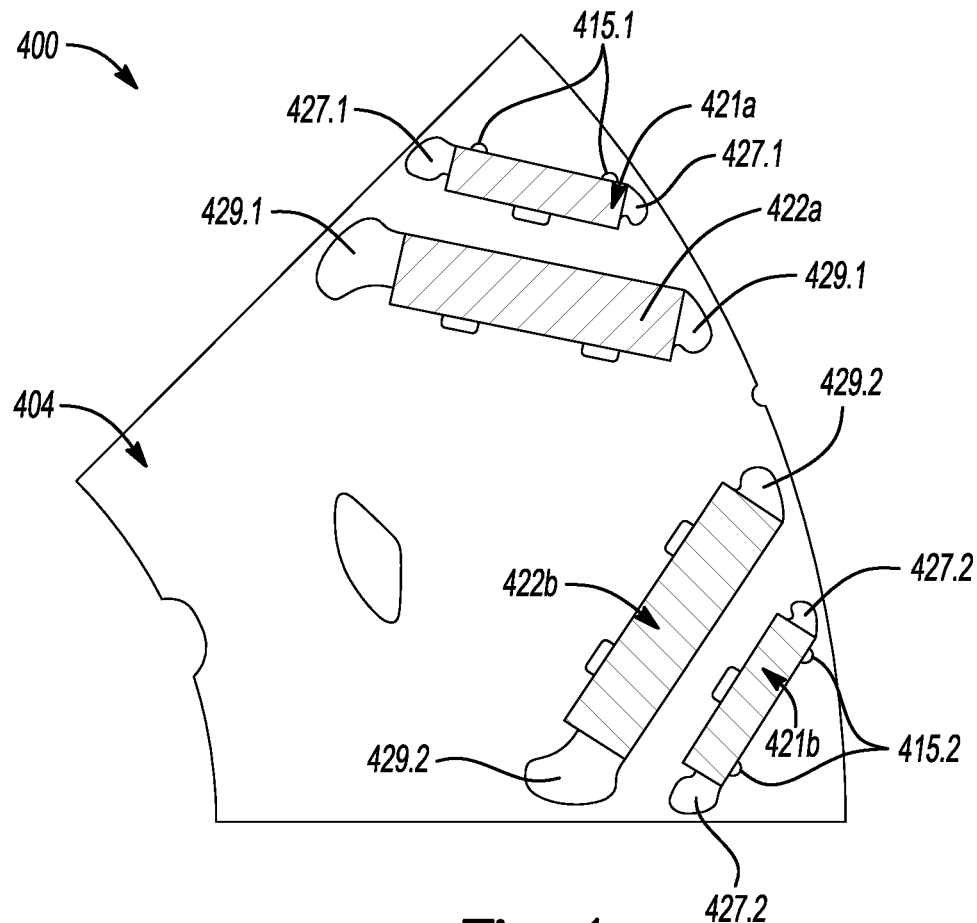
FIG. 4 is another exemplary cross-sectional view of a portion of a rotor used in a synchronous permanent magnet motor, in accordance with an embodiment using a symmetric notch design.

FIG. 4 is another exemplary cross-sectional view 400 of a portion of a rotor 404 used in a synchronous permanent magnet motor, in accordance with an embodiment using a symmetric notch design. Similar to previous embodiments, the illustration shows an angular portion of the rotor. For clarity and simplicity, two smaller magnets 421a and 421b and two larger magnets 422a and 422b are used in a pair of two opposing magnet pockets. The magnet pockets, like before, may include outer air gaps that may also differ in shape and size. To avoid overpopulating the figure with excessive references, each magnet pocket is also referenced by its outer air gap. That is, the four magnet pockets shown include magnet pockets 427.1 and 427.2 for the smaller magnets 421a and 421b, and magnet pockets 429.1 and 429.2 for the larger magnets 422a and 422b.

FIG. 4 includes a symmetric notch design for rotor 404. To maintain symmetry over the entire angular portion of the rotor 404, this notch configuration may be reproduced for different angular portions of the rotor that include the four magnets. In other configurations, a different symmetric configuration may be used, such as one configuration for a first half of an even number of four-magnet sections, and another configuration for a second half of the even number of four magnet sections.

Referring to the magnet pocket 427.1, two identically sized notches 415.1 are arranged on its outer edge. Referring to the counterpart magnet pocket 427.2, two more notches 415.2 are shown on its outer edge. Each of notches 415.2 may have the same size as notches 415.1. Further, the relevant position of each of notches 415.1 and 415.2 on the respective outer edges is the same, so the notches are symmetric in number, size and position.

Referring next to the magnet pocket 429.1, the outer edge has no notches. Comparing this configuration to the outer edge of magnet pocket 429.2, the outer edge likewise has no notches. Thus, the larger magnet pockets are symmetrically arranged, and the resulting configuration of the rotor 404 is a symmetrical one, assuming the remaining angular portions of the rotor 404 are also symmetrical as described above.

The symmetric notch configuration has various advantages. The notches are placed on the small magnet pockets in this example. The notch size and location are symmetric for magnet pockets. The use of small notches tends to avoid substantial reductions to average output torque. Thus, slot order harmonics may be reduced, such as in an example motor involving 96 mechanical slots from 0 to 360 degrees, or equivalently 24 electrical slots. The completion of one electrical cycle includes when the north and south poles complete one rotation.

Figure 5:
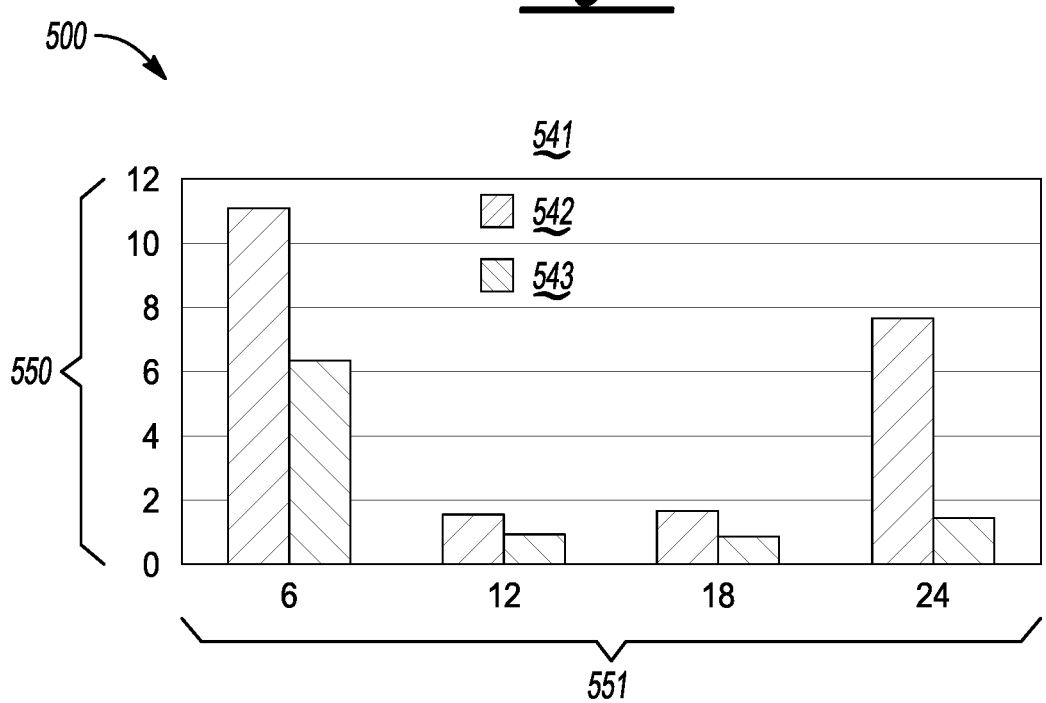
FIG. 5 is an exemplary diagram showing measurement results comparing torques at different slot harmonic orders between a configuration using the symmetric notch design of FIG. 4 and an existing synchronous motor implementation without incorporating the notches.

FIG. 5 is an exemplary diagram 500 showing measurement results comparing torques at different slot harmonic orders between a configuration using the symmetric notch design of FIG. 4 and an existing synchronous motor implementation without incorporating the notches. The voltage from the armature windings of a synchronous motor are assumed to be smooth. In actuality, the armature is slotted, which tends to create the unwanted torque ripple. For this example, FIG. 4 includes 96 mechanical slots or 24 electrical cycles. The reference number 541 identifies the diagram 500 as showing harmonics based on a maximum torque output—namely, the DC torque when the motor is at its maximum output limit. Legend 542 identifies the electromagnetic torque (EMT) via a base configuration—that is to say, FIG. 4 shows two of eight poles and the base EMT is identified by legend 542. Legend 543 shows the EMT using the notch design as described by FIG. 4 across its poles.

The vertical axis 550 of FIG. 5 represents the torque defined in Newton-meters (Nm). The horizontal axis 551 represents the electrical harmonic order. As is evident from FIG. 5, the symmetric notch design reduces every harmonic in the torque. The most dramatic reduction is at the $24^{th}$ or highest electrical slot harmonic.

Figure 6:
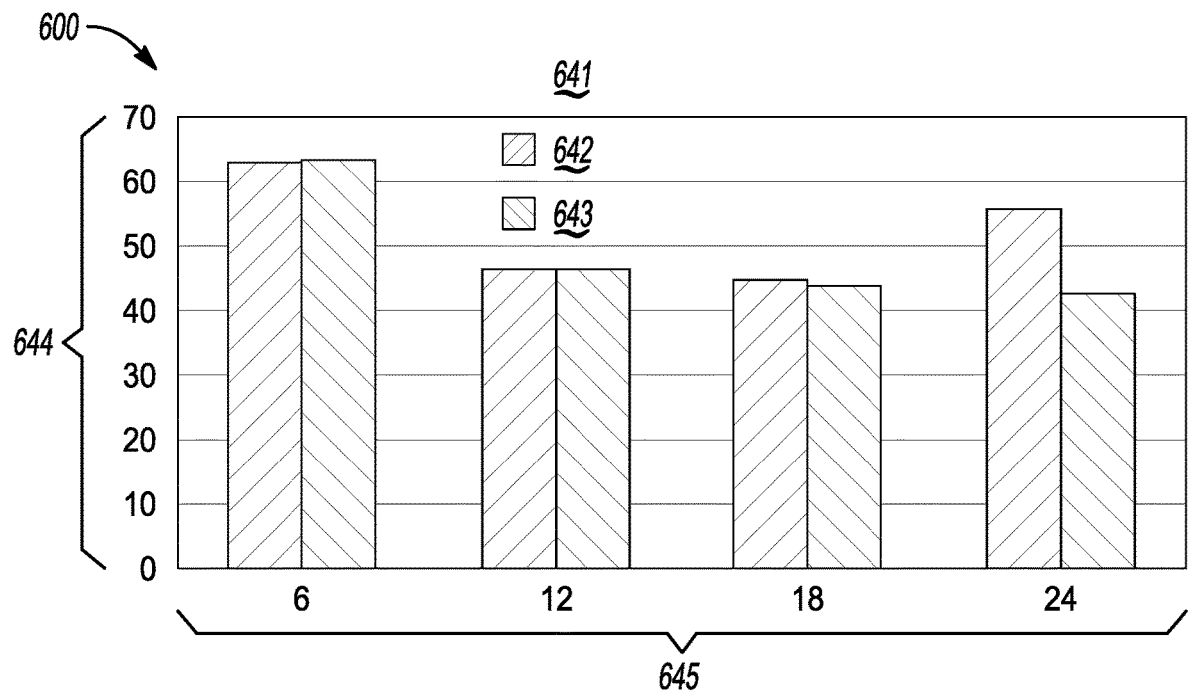
FIG. 6 is an exemplary diagram showing a comparison in the square root of sum-of-squares (SRSS) force as a function of slot harmonic order between a motor configuration using the symmetric design of FIG. 4 and an existing synchronous motor implementation without incorporating the notches.

It was also found that the SRSS force is improved using the symmetric notch design of FIG. 4. FIG. 6 is an exemplary diagram 600 showing a comparison in the square root of sum-of-squares (SRSS) force 641, shown as force in decibels (dB) on the vertical axis 644, as a function of slot harmonic order, shown on the horizontal axis 645 between a motor configuration using the symmetric design of FIG. 4 and the same synchronous motor implementation without incorporating the notches. Legend 642 represents the motor using the symmetric notch design of FIG. 4, without the notches on the outer edges of the small magnet pockets. Legend 643 represents the same motor using the notches on the outer edges of the small magnet pockets. The SRSS force is a force measured in the radial direction, which causes the motor to vibrate radially and hence generate noise. Here, the SRSS force is improved, especially in higher harmonic orders in the $18^{th}$ and $24^{th}$ harmonics. The dB nature of the scale understates the improvement. The SRSS force was measured using a maximum output torque of the motor.

Figure 7:
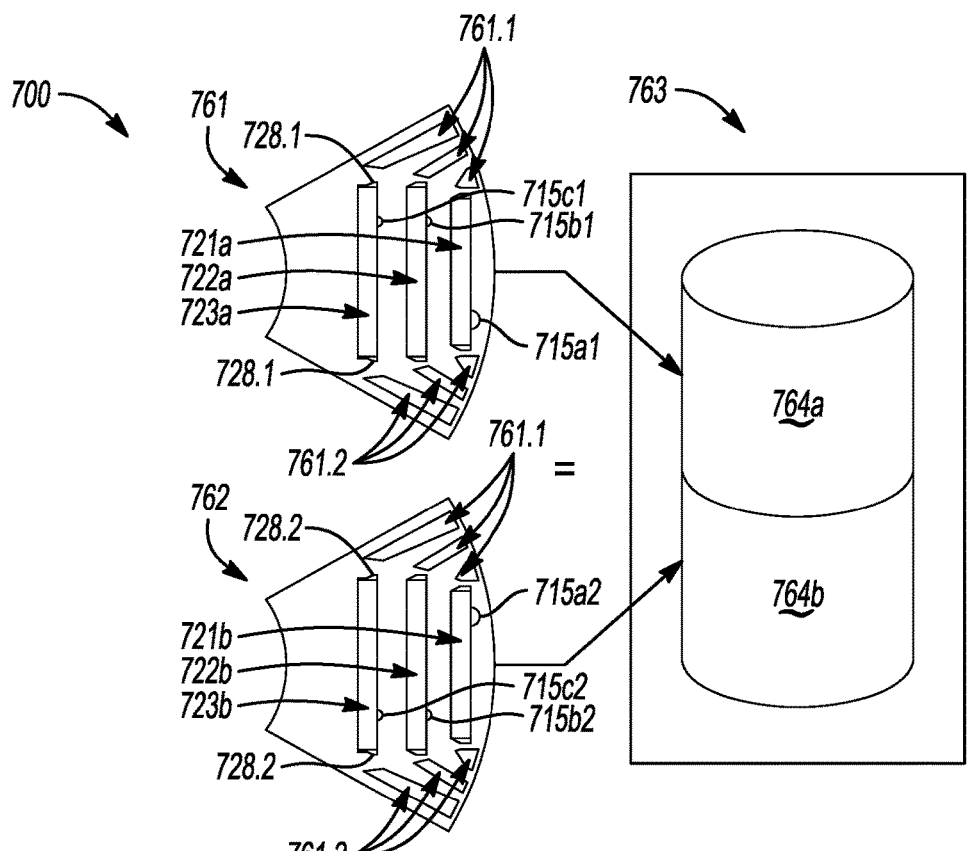
FIG. 7 is an exemplary perspective view of a cylindrically shaped rotor according to an embodiment, with an upper axial half of the layers having one configuration of notches as shown in a first rotor cross section and a lower axial half of the layers having an asymmetrically opposed configuration of notches relative to the notch configuration in the upper half.

FIG. 7 is an exemplary perspective view 700 of a cylindrically shaped rotor 763 according to an embodiment, with an upper axial half 764a of the layers having one configuration of notches as shown in a first rotor cross section 761 and a lower axial half 764b of the layers having an asymmetrically opposed configuration of notches in a second rotor cross section 762 relative to the notch configuration in the upper half. In previous embodiments, the concentration was on the configuration of notches in a radial direction. In this illustration, the focus includes the configuration of notches in an axial direction and the corresponding advantages that may be achieved.

Shown first is an example rotor 763, which for purposes of simplicity is cylindrical in nature, although different geometries may be used. The rotor 763 may include an upper half 764a and a lower half 764b. Unlike in previous representations, the view of rotor 763 is along a longitudinal axis, from a lower part of the page to an upper part of the page. Thus, the rotor may spin in either direction along a hypothetical axis traversing the center of the cylinder.

It should be understood that, while the configuration of FIG. 7 expresses a synchronous permanent magnet motor, the principles of the disclosure may apply with equal force to that of a synchronous reluctance motor. For example, each of first cross section 761 and second cross section 762 represent, as before, an angular portion of a cross section of one of the layers in upper half 764a or lower half 764b, as applicable. However, the identified upper and lower portions 764a and 764b may in other embodiments correspond to smaller axial sections of the rotor. Thus, the configuration may be changed in different sections, with each section equaling one or more axially laminated layers. Referring again to the cross section 761, if the magnets 721a, 722a and 723a are removed, the remaining pockets represent something much closer to flux barriers in a synchronous reluctance motor, to which notches may be added on the respective outer edges to improve performance by reducing torque ripple.

As noted, the cylindrical rotor 763 of the embodiment of FIG. 7 includes a plurality of axially laminated layers sandwiched together to form the resultant cylinder. Each one (or each section) of the layers may include a circular version of the angular portion of the first and second cross sections 761 and 762, with the magnet pocket pattern in each layer repeated a number of times to achieve the desired pole configuration. Here again, referring to the first cross section 761, just the relevant angular portion is shown for simplicity. The first cross section includes three magnet pockets corresponding to magnet 721a, magnet 721b, and magnet 721c. The first cross section 761 also includes two sets of symmetrically spaced pockets 761.1 and 761.2. The three magnet pockets include, on each side, a small air gap 728.1

Referring now to the second cross section 762 used in the lower half 764b of layers, an initially identical configuration shows the three magnet pockets corresponding to magnet 721b, magnet 722b, and magnet 723b. Identical pockets 761.1 (not including magnets) extend on one edge of the three magnet pockets, and pockets 761.2 extend on the other edge of the three magnet pockets. At the side of each of the three magnet pockets is a small air gap 728.2.

Referring specifically to the notches in initially the first cross section 761 of layers, the magnet pockets include notches on selected outer edges. The magnet pocket corresponding to magnet 721a includes a single notch 715a1 near the bottom of the outer edge. The magnet pocket corresponding to magnet 722a includes a very small notch 715b1 near the top on the outer edge. The magnet pocket corresponding to magnet 723a includes a single notch 715c1 near the outer edge.

Referring now to the notches in the second cross section 762 of layers, the three magnet pockets corresponding to magnet 721b, magnet 722b, and magnet 723b are identical to the three magnet pockets present in the first cross section 761 of layers. Further, the side pockets 761.1 and 761.2 are identical to the side pockets 761.2 and 761.1, respectively. The notches on the three magnet pockets in the respective outer edges of the first cross section 761—i.e., notches 715a2, 715b2, and 715c2—are also identical respectively to the notches 715a1, 715b1, and 715c1, except that they are inverted. This means that to fabricate the upper half 764a and the lower half 764b of rotor 763, the manufacture may use the same layer, inverted and, if desirable, angularly offset between the upper half 764a and the lower half 764b. Inverting the upper half relative to the lower half produces an overall vertical asymmetry in the layers. Advantageously, this configuration may be easily achievable by using a single layer and inverting the layer where appropriate. The results may be simulated to determine the effect on torque ripple. By virtue of the inversion of layers, the notches in the first cross section 761 are positioned in different angular locations as the same notches in the second cross section 762—that is to say, different angular locations relative to an angular component of the rotor.

The result in FIG. 7 may logically be applied to not merely an upper and lower axial half of the rotor, but to other even numbers of sections of the rotor. For example, the rotor 763 may be partitioned into several axially laminated layers, with certain sections of the layer inverted with respect to others to achieve the vertical asymmetry desired. The same lamination may be used as in FIG. 7, or at most, multiple different sections can be produced using a reduced number of laminations. Because the rotor may spin in either direction, one significant advantage of this configuration is that the average torque does not change.

Figure 8:
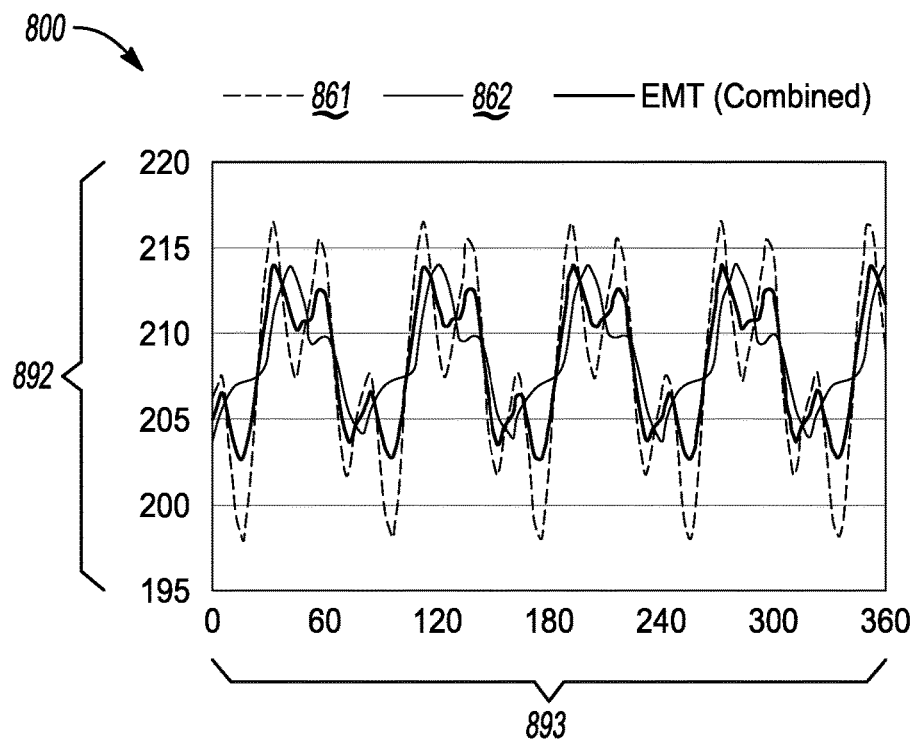
FIG. 8 is a diagram of the relative torques as a function of angular rotor position using a multi-layer synchronous machine that includes (i) a rotor having only the notch configuration in the upper layer of FIG. 7, (ii) a rotor having only the notch configuration in the lower layer of FIG. 7, and (iii) a rotor having the combined notch configurations in the respective layers of the upper and lower halves.

FIG. 8 is a diagram 800 of the relative torques as a function of angular rotor position using a multi-layer synchronous machine that includes (i) a rotor having the notch configuration in the upper layer of FIG. 7 as shown by the waveform represented by legend 861, (ii) a rotor having the notch configuration in the lower layer of FIG. 7 as shown by the waveform represented by legend 862, and (iii) a rotor having the combined notch configurations in the respective layers of the upper and lower halves that shows the combined EMT waveform. In the exemplary asymmetric motor shown, the motor has six poles total or three pole pairs, and a slot order of 54, which collectively results in a torque ripple that will manifest in the output waveform.

The vertical axis 892 represents torque in Nm, and the horizontal axis 893 represents angular position of the rotor measured in degrees. As shown in FIG. 8, the asymmetric design shows that from a peak-to-peak value of torque, the waveform ripple is reduced. Advantageously, the average torque in the combined waveform is similar, but the ripple is reduced. Also, because the motor may spin from left to right or from right to left, the individual legends 861 and 862 may not be as important as the combined EMT waveform, the latter of which accommodates ripple reduction in both directions. Also, as noted, in the case of a synchronous reluctance motor, the magnet pockets may be replaced by pockets that include the flux barriers, with notches placed selectively on the outer edges thereof.

Figure 9:
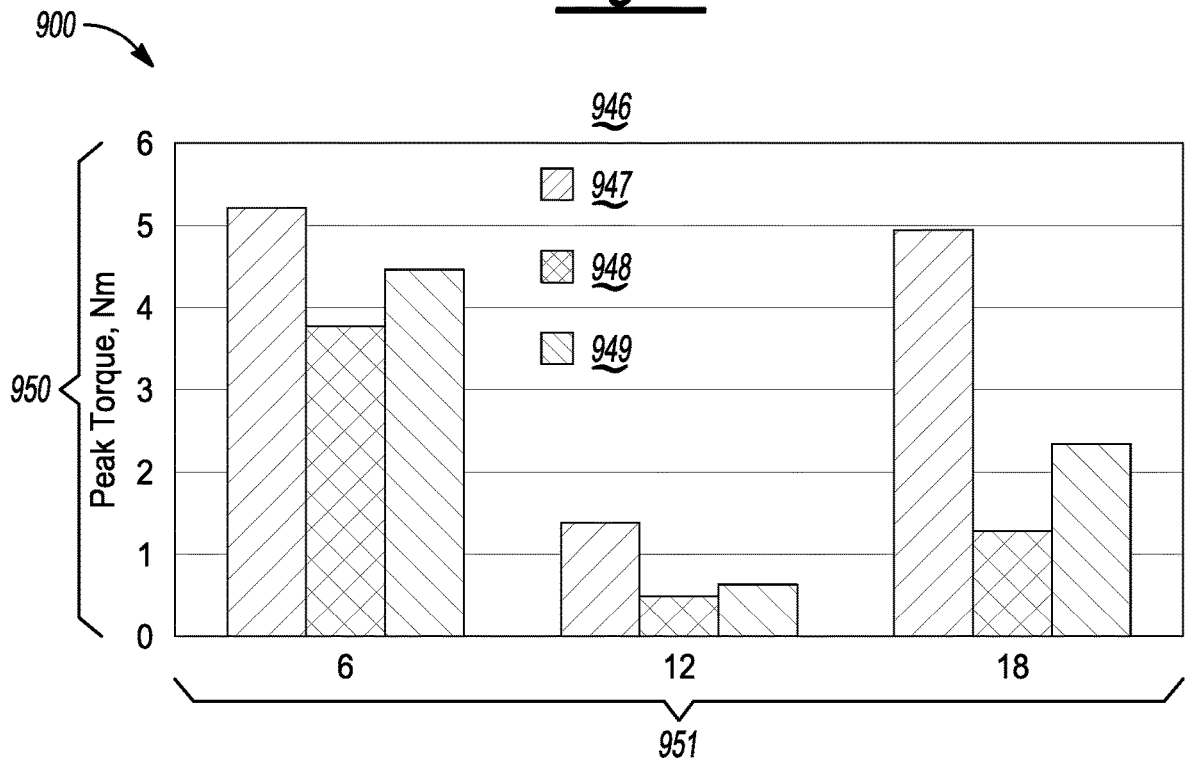
FIG. 9 is an exemplary diagram showing measurement results comparing torque ripple harmonics of a multi-layer synchronous machine in the three rotor configurations of FIG. 7 by measuring the peak torques at different harmonic orders for each configuration.

FIG. 9 is an exemplary diagram 900 showing measurement results comparing torque ripple harmonics 946 of a multi-layer synchronous machine in the three rotor configurations of FIG. 7 by measuring the peak torques (vertical axis 950) at different harmonic orders for each configuration (horizontal axis 951). Legend 947 represents the waveform using the first (upper) position 764a of the rotor 763. In this case, the upper portion 764a may be spread out to represent the entire cylindrical rotor 763 with the properties of first cross section 761 in each layer. Legend 948 represents the waveform using the second (lower) position 764b of the rotor. Legend 949 represents the combined EMT waveform using both the upper portion 764a and lower portion 764b of the waveform.

Considering the results, the combined EMT waveform represents an improvement in torque ripple harmonics, especially at higher harmonic orders (12 and 18 in axis 951). This shows that the design features may be used to minimize torque ripple. Notches may be asymmetrically positioned in different sections of the rotor by simply inverting the layers that are axially laminated. Another advantage of this configuration is that it assists in minimizing the slot order of the synchronous machine. This includes examples of (1) a 24 electrical order (or 96 mechanical order) present in a 96-slot, 8-pole synchronous machine, and (2) an 18 electrical order (or 54 mechanical order) present in a 54-slot, 6-pole machine.

In addition, as shown in FIG. 6, the symmetric notch configuration reduces the SRSS force. For example, the $24^{th}$ electrical ($96^{th}$ mechanical) order SRSS force reduces in a 96 slot, 8 pole machine as in FIG. 8. The notch design may also be simplified as a function of motor slot, pole and operating point. Using this data as a baseline, the number, geometry, location, and symmetry (or absence thereof) may be used to determine an optimum notch geometry for the selected outer edges of pockets including magnet pockets, flux barriers, and air gaps.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A synchronous electric motor, comprising;
    a stator comprising a plurality of protrusions arranged around an inner periphery to define slots between adjacent ones of the protrusions, and a plurality of conductive windings axially traversing at least some of the slots, the windings configured to carry alternating currents for generating a rotating magnetic field (RMF); and
    a rotor within the stator and configured to rotate based on a torque induced by an interaction between the RMF and magnetic features of the rotor, the rotor having one or more pockets formed therein, the one or more pockets having outer edges relative to a radial component of the rotor, wherein the rotor comprises a plurality of individually identical axially laminated layers that each include the one or more pockets and that together form a stack, the stack comprising an upper section and a lower section,
    wherein the one or more pockets include at least one notch formed in selected ones of the outer edges and configured to reduce torque ripple during motor operation, and wherein:
        the layers of the lower section are inverted relative to the layers of the upper section;
        the upper and lower sections each have the same number of layers; and
        the at least one notch included in the upper section is asymmetrically opposed in angular position relative to the corresponding at least one notch in the lower section.

2. The motor of claim 1, wherein the at least one notch is semi-elliptical in shape.

3. The motor of claim 1, wherein the motor comprises a synchronous reluctance motor, and wherein the one or more pockets comprise flux barriers.

4. The motor of claim 1, wherein the motor comprises a permanent magnet synchronous motor, and wherein the one or more pockets further comprise one or more magnet pockets, respectively, each of the one or more magnet pockets configured to hold one or more permanent magnets.

5. The motor of claim 4, wherein the selected ones of the outer edges include a single notch.

6. The motor of claim 4, wherein the one or more magnet pockets comprise a large magnet pocket for holding a larger magnet and a small magnet pocket for holding a smaller magnet.

7. The motor of claim 4, wherein the one or more magnet pockets include first and second magnet pockets, the first magnet pocket having a different number, size, shape or position of notches than the second magnet pocket.

8. The motor of claim 6, wherein the at least one notch is disposed on one or both of an outer edge of the large magnet pocket or another outer edge of the small magnet pocket.

9. The motor of claim 1, wherein:
the at least one notch comprises a plurality of notches arranged at the selected outer edges of the one or more pockets; and
the plurality of notches are positioned in different angular locations relative to an angular component of the rotor.

10. The motor of claim 1, wherein:
the rotor comprises at least one set of two pockets in complementary positions relative to one another; and
a first of the two pockets includes one or more notches symmetrically disposed in size and location relative to a corresponding one or more notches included on a second of the two pockets.

11. The motor of claim 10, wherein slot order harmonics include ripple torque at frequencies determined by a spacing between adjacent slots.

12. The motor of claim 1, wherein a size of the notch, including a width or a depth of the notch, is optimized to reduce the torque ripple without a corresponding decrease in motor performance exceeding a threshold.

13. A synchronous interior permanent magnetic (IPM) electric motor, comprising;
a stator comprising a plurality of protrusions disposed around an inner periphery to create a plurality of corresponding slots inset around the inner periphery, and a plurality of conductive windings axially traversing some or all the slots, the windings configured to carry alternating currents for collectively producing a rotating magnetic field (RMF); and
a rotor positioned within the stator and configured to rotate based on a torque caused by an interaction between the rotor and the RMF, the rotor comprising one or more magnet pockets, each magnet pocket having one or more magnets inset therein, wherein the rotor comprises a plurality of individually identical axially laminated layers that each include the one or more pockets and that together form a stack, the stack comprising an upper section and a lower section;
wherein selected outer edges of the one or more magnet pockets include at least one semi-elliptically shaped notch for reducing torque ripple generated by slot order harmonics, and wherein:
the layers of the lower section are inverted relative to the layers of the upper section;
the upper and lower sections each have the same number of layers; and
the at least one notch included in the upper section is asymmetrically opposed in angular position relative to the corresponding at least one notch in the lower section.

14. The motor of claim 13, wherein the one or more magnet pockets include, in the selected outer edges, a single notch, each respective single notch varying relative to each other with respect to size, number, or position.

15. The motor of claim 13, wherein the one or more magnet pockets comprise a large magnet pocket for holding a larger magnet and a small magnet pocket for holding a smaller magnet.

16. The motor of claim 13, wherein a first section within the rotor comprises a magnet pocket having a different number, size, shape, or position of notches than another magnet pocket included in a second section within the rotor.

17. The motor of claim 15, wherein the at least one semi-elliptically shaped notch is disposed on one or both of an outer surface of the large magnet pocket or an outer surface of the small magnet pocket.

18. A synchronous reluctance electric motor, comprising;
a stator comprising a plurality of protrusions disposed around an inner periphery to create a plurality of corresponding slots arranged around the periphery, and a plurality of coils wound around some or all the protrusions, the coils configured to carry alternating currents for collectively producing a rotating magnetic field (RMF); and
a rotor positioned within the stator and configured to rotate based on a torque created by a tendency of the rotor to attempt to align with the RMF, the rotor comprising a plurality of axially laminated layers that together form a stack, at least one of the plurality of layers comprising one or more pockets, wherein the rotor comprises a plurality of individually identical axially laminated layers that each include the one or more pockets and that together form a stack, the stack comprising an upper section and a lower section;
wherein selected outer edges of the one or more pockets include at least one semi-elliptically shaped notch for reducing torque ripple, and wherein:
the layers of the lower section are inverted relative to the layers of the upper section;
the upper and lower sections each have the same number of layers; and
the at least one notch included in the upper section is asymmetrically opposed in angular position relative to the corresponding at least one notch in the lower section.

19. The motor of claim 4, wherein the selected ones of the outer edges include a plurality of notches.

20. The motor of claim 13, wherein the one or more magnet pockets include, in the selected outer edges, a plurality of notches varying relative to each other with respect to size, number, or position.

\* \* \* \* \*